United States Patent [19]
Pfefferle et al.

[11] Patent Number: 5,636,511
[45] Date of Patent: Jun. 10, 1997

[54] TORCH ASSEMBLY

[75] Inventors: William C. Pfefferle, Madison; E. Jack Sweet, Trumbell; Greg Jackson, New Haven, all of Conn.

[73] Assignee: Precision Combustion, Inc., New Haven, Conn.

[21] Appl. No.: 466,118

[22] Filed: Jun. 6, 1995

Related U.S. Application Data

[63] Continuation-in-part of Ser. No. 317,378, Oct. 4, 1994, which is a continuation of Ser. No. 227,596, Apr. 14, 1994, which is a continuation of Ser. No. 197,931, Feb. 17, 1994, which is a continuation of Ser. No. 835,556, Feb. 14, 1992, Pat. No. 5,453,003.

[51] Int. Cl.⁶ .................................................. F02C 7/264
[52] U.S. Cl. ......................... 60/39.822; 60/39.826; 60/723; 431/268

[58] Field of Search ................. 60/39.822, 39.826, 60/723; 431/7, 170, 268

[56] References Cited

U.S. PATENT DOCUMENTS

| | | | |
|---|---|---|---|
| 3,355,885 | 12/1967 | Toone | 60/39.822 |
| 4,455,822 | 6/1984 | Bayle-Laboure et al. | 60/39.822 |

*Primary Examiner*—Charles G. Freay
*Attorney, Agent, or Firm*—Kane, Dalsimer, Sullivan, Kurucz, Levy, Eisele and Richard

[57] ABSTRACT

The conventional gas turbine combustor is improved by mounting a pilot flame producing torch in a wall of the combustor to project a flame into the combustor as a means of ignition. The torch preferably is a catalytic igniter which will operate over a wide range of air/fuel ratios.

11 Claims, 1 Drawing Sheet

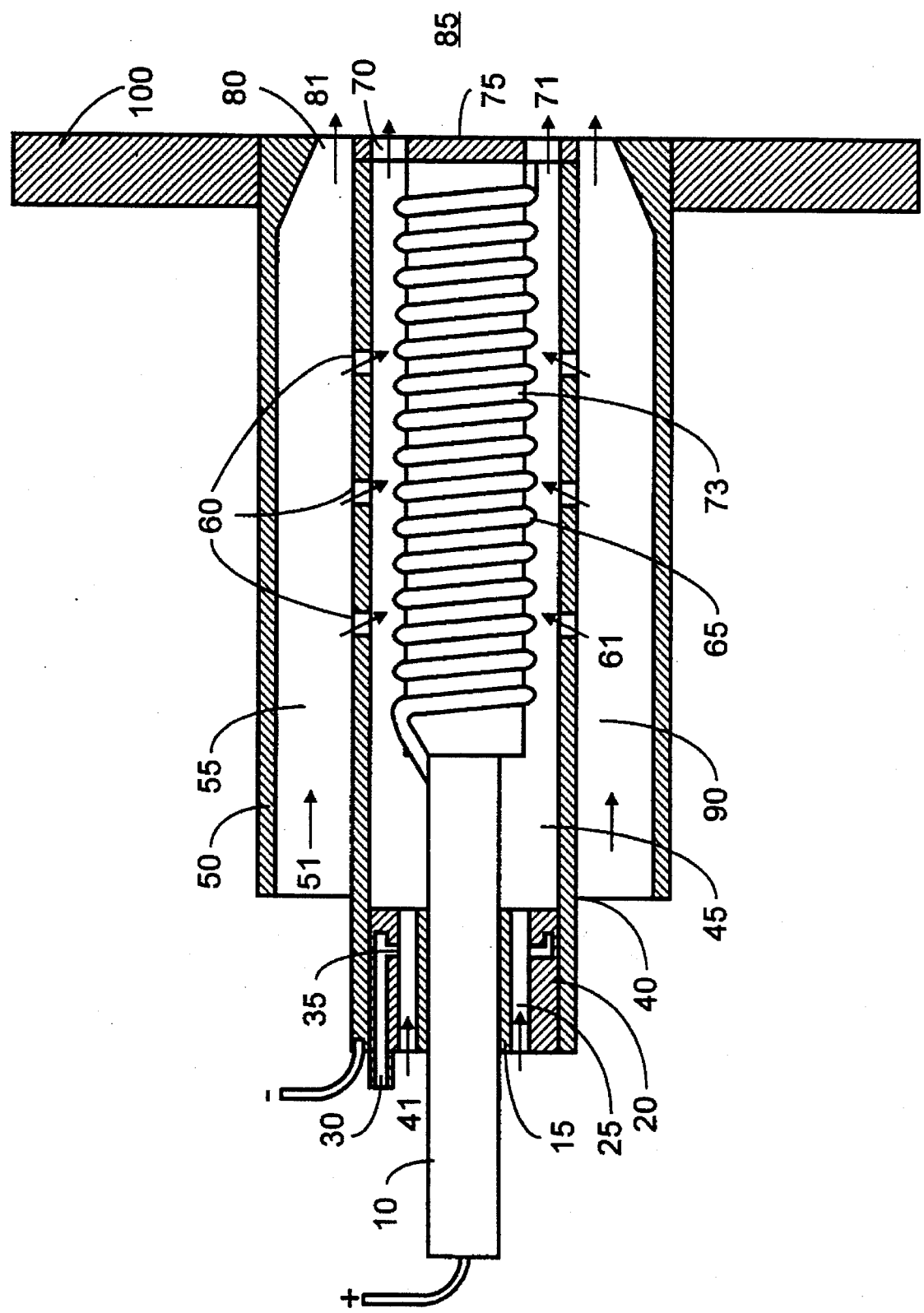

TORCH ASSEMBLY

CROSS-REFERENCE TO RELATED APPLICATIONS

This application is a Continuation-In-Part of copending U.S. patent application Ser. No. 08/317,378 filed Oct. 4, 1994 which is a Continuation of U.S. patent application Ser. No. 08/227,596 filed Apr. 14, 1994, which is a Continuation of U.S patent applicaton Ser. No. 08/197,931 filed Feb. 17, 1994, which is a Continuation of U.S. patent application Ser. No. 07/835,556 filed Feb. 14, 1992 which has issued as U.S. Pat. No. 5,453,003.

BACKGROUND OF THE INVENTION

This invention was made with government support under F33615-93-C-2355 awarded by the United States Air Force. The U.S. government has certain rights in this invention.

FIELD OF THE INVENTION

The invention relates to an assembly for ignition of gas turbine combustors. In addition, this invention relates to devices for continuous stabilization/re-ignition of lean low $NO_x$ combustion. This invention also relates to igniters for use in place of conventional spark plug fuel ignition systems.

BRIEF DESCRIPTION OF RELATED ART

Commercial aircraft gas turbine combustors utilize combustor wall mounted igniters, typically a spark plug, for combustor light-off. This requires the presence of fuel close to the wall. Inasmuch as combustion of fuel near the wall during full power operation tends to raise the wall temperature, combustor designs tend to be a compromise between ignition and operational requirements. Thus there have been numerous attempts to achieve ignition away from the wall. Ideal, ignition should be achieved right at the fuel source so that ignition of the initial fuel flow is possible. This avoids the necessity to dump unburned fuel into the combustor prior to ignition (creating the potential for hot starts or explosive detonations with consequent damage to the turbine) and enables the use of spray patterns which keep fuel away from the combustor walls. Accordingly, there has been interest in integrating the ignition source into the fuel injector. For example, U.S. Pat. No. 4,938,019 describes a fuel nozzle with an integrated spark plug igniter assembly and U.S. Pat. No. 4,825,658 describes a fuel nozzle with a catalytic glow plug igniter assembly. Such designs have major drawbacks which limit utility. For example, a spark plug integrated into an injector is subject to fouling if wetted by liquid turbine fuel, rendering it inoperative. In addition, size limitations reduce spark plug life. On the other hand, although the glow plug of U.S. Pat. No. 4,825,658 eliminates the fouling problem of spark plugs, the glow plug is designed such that the return flow of the recirculating flow downstream of the injector contacts the hot glow plug surface resulting in ignition of the downstream recirculating gases. Inasmuch as the initial direction of the incoming fuel-air flow from the swirler is away from the glow plug considerable fuel can travel downstream before sufficient fuel is injected to increase the recirculation zone fuel concentration high enough at the glow plug to allow ignition. Thus explosive detonation is possible as is the case with conventional spark igniters presently used in aircraft gas turbine engines. Advantageously, fuel should be ignited immediately as it enters the combustor.

In the present invention atomized fuel entering a gas turbine combustor is reliably ignited as it enters the combustor by contact with a continuous pilot flame projected into the combustor distal to the combustor walls, at a location to ignite the incoming fuel. The present invention offers the advantages of away-from-the-wall ignition coupled with continuous flame stabilization by providing for projection of the pilot flame into a combustor, whether from the liner wall or from the combustor centerline, such as if mounted within a fuel nozzle.

SUMMARY OF THE INVENTION

The invention comprises an improved torch assembly for ignition of fuel in admixture with air within a gas turbine combustor, which comprises:

a tubular chamber containing a hot surface, preferably catalytic, ignitor, means for atomizing fuel into admixture with air, a primary zone for fuel vaporization, a secondary zone for air addition and partial fuel reaction, and an exit opening for pilot flame establishment and projection into the combustor.

BRIEF DESCRIPTION OF THE DRAWING

The drawing shows a partial cross-sectional side view of an embodiment of the catalytic ignitor/flame stabilizer torch assembly of the invention having an axially mounted surface ignitor.

DETAILED DESCRIPTION OF THE PREFERRED EMBODIMENTS OF THE INVENTION

Those skilled in the art will gain an appreciation of the invention from reading the following description of the preferred embodiments of the invention in conjunction with a viewing of the accompanying drawing. With reference to the drawing, which is a cross section of an embodiment assembly of the invention as seen from the side, torch assembly 90 comprises tube 40 shown situated inside an outer coaxial tube 50 which may be an inner wall of a fuel nozzle or as shown, a fitting on combustor liner wall 100. The outer coaxial tube 50 which houses the assembly carries air flow 51 which may be preferably swirled in the space 55 around the assembly and out through restriction 80 at the end of the outer tube 50 and into the gas turbine combustor, not shown. The gas turbine combustor, such as the example described in U.S. Pat. No. 3,975,141 which is incorporated herein by reference thereto, can have a variety of configurations and air flow patterns inside the combustor. Fuel/air manifold 20 which restricts the flow of air 41 entering the assembly through passageways 25. Fuel/air manifold 20 includes a fuel tube 30 which provides fuel to the manifold. Fuel injection ports 35 provide partially atomized fuel to the high velocity air flows 41 in passageways 25. In the preferred configuration, the fuel is atomized and partially vaporized by air flowing through the passageways 25 in the manifold, but other atomization techniques may be used such as for example atomizers described in U.S. Pat. Nos. 4,255,777; 4,380,786; 4,581,675; 4,991,774; and 5,093,602, all of which are incorporated herein by reference thereto. The partially atomized fuel is carried by the air flow into chamber 45 inside the assembly where the fuel is further vaporized before passing into contact with igniter 65. Fuel/air manifold 20 also serves as a mount for electrode 10 which supplies power to ignitor 65. An electrically non-conductive layer 15 isolates the electrode 10 from the fuel/air manifold 20. The electrode 10 is connected to an electrical power source, not shown, exterior to the combustor. The electrode 10 is electrically connected to the surface ignitor 65. In preferred embodiments of the invention, the ignitor is a resistance heating element which supports an oxidation catalyst on the surface or an electrically conductive metal oxidation catalyst such as platinum or an electrically conductive oxide ceramic. For example, the element 65 can be a 0.035 mm Hastelloy-X resistive wire coated with any ignition catalyst known in the art, or element 65 can be a platinum structure 0.020 mm thick and machined to provide a reasonably long conductive path. In the embodiment shown, the ignitor 65 is in the form of a coil of oxide hardened platinum wire mounted on ceramic support 73. For long-life and durability, the element 65 is itself a catalyst which can provide a high temperature surface for fuel pre-reaction before downstream combustion in region 85 after the exit of the assembly. The temperature of the element is most readily monitored and controlled either by measurement of element resistance or by a temperature-sensing device such as a thermocouple or an infrared detector. In the drawing the ignitor element 65 is positioned axially down the center of the tube 40 in the space 45 extending to or close to the tube exit aperture 70, but the ignitor 65 need not, of course be in any particular shape or configuration as long as it presents a surface for contact with and ignition of the hydrocarbon fuels. The terms "fuel" and "hydrocarbon" as used in the present invention not only refer to organic compounds, including conventional liquid and gaseous fuels, but also to gas streams containing components such as carbon monoxide, organic compounds, or partial oxidation products of carbon containing compounds. In the preferable configuration, a durable electrical connection which can sustain high temperatures is made through a conductive end piece 75 from the ignitor element to the assembly tube 40. An electrical lead which provides the return lead to the power source can then be attached to the upstream end of tube 40. This provides an electrical circuit for providing a means of externally heating the ignitor. In the circuit, the ignitor element 65 must be the region of highest resistance in order to ensure that when electrical power is supplied through the leads the ignitor element is heated to a much higher temperature than the other parts of the circuit path.

The expansion of the flow of fuel and air out of the fuel/air manifold 20 into the inner lumen 45 of the assembly provides a low pressure region in the lumen 45 to allow for staged air addition into the assembly further downstream through small air addition holes 60 in the assembly tube. In the preferable embodiment, the air flow 61 through the side holes 60 is enhanced by the downstream restriction 80 in the outer housing tube which keeps the pressure in the space 55 outside the assembly relatively high in comparison to that in the inner lumen 45. The air flow 61 through the air addition holes 60 serve a dual purpose of controlling the temperature distribution along the surface of the ignitor element 65 and of increasing the air to fuel ratio to enhance reaction of the vaporized fuel and to allow for combustion of the admixture after exiting into the gas turbine combustor chamber in region 85.

In the preferable embodiment, the flow across the ignitor element 65 is maintained at a high enough velocity to limit combustion inside the assembly and thus increase durability of the ignitor element 65. Combustion of the partially reacted fuel is then stabilized in the combustion zone inside the gas turbine combustion chamber in region 85. Although air flow 81 and tube 50 are not required in all applications, combustion stabilization in region 85 can be enhanced by swirling the additional flow 81 which exits from an outer passage around the assembly exit as shown in the figure. With continuous operation, ignitor element 65 allows for stable combustion of a combustor at leaner overall fuel/air admixtures than otherwise possible. The hot partially-reacted flow 71 passing through the assembly exit 70 travels at relatively high velocities which insures that the pilot flame in region 85 extends well into the combustion chamber and provides a robust source of ignition for other fuel injected into the gas turbine combustor. Torches of the present invention may be operated with either overall lean or overall rich fuel/air mixtures as dictated by the requirements of the combustor with which it is used. In one preferable embodiment, the assembly 90 would be placed along the center axis of a main air-blast fuel nozzle, which sprays into the primary combustion zone of a gas turbine combustion chamber. In this embodiment, the torch provides an ideal source of ignition in region 85 for the entire fuel flow even at lean combustor operating conditions. The use of a catalytic ignitor element 65 in the assembly enhances the ability of the assembly 90 to work well at lean conditions and enables stable operation of the torch after initial light-off with little or no electrical power.

The operation of the assembly 90 can be appreciated by referring again to the drawing. The high velocity air flow 41 through the passageways 40 in the fuel/air manifold 20 carries the partially atomized fuel into the lumen 45 inside the assembly and over the electrically-heated surface ignitor element 65. After the fuel is vaporized and partially reacted in intenal space 45 of the assembly 90, air flow 61 is added through the air addition holes 60 through the assembly tube 40 from the outer space 55 around the assembly 90. The added air 61 mixes with the fuel/air admixture over the ignitor 65 surface and furthers partial reaction of the fuel over the hot, preferably catalytic, ignitor element 65. The fuel/air admixture is continually heated and partially reacted over the ignitor 65 surface until it passes with a relatively high velocity into the gas turbine chamber in region 85 where it burns to completion and provides a robust pilot flame for igniting fuel injected into the gas turbine combustor chamber. Because the ignitor element 65 can be electrically heated before fuel is injected into the assembly 90 or into the gas turbine chamber, the torch assembly 90 can provide almost instant ignition of both the assembly fuel as well as the main fuel to the gas turbine combustion chamber.

In torch assemblies of the invention the pilot flame is established and stabilized downstream of the assembly. Swirling the flow 51 through an outer passage enhances flame stabilization in region 85. During starting of a gas turbine engine, typically the element 65 is heated to a temperature above the minimum temperature required for ignition at the given air flow condition prior to introduction of fuel thus assuring a rapid light-off. After light-off, electrical power and/or fuel flow to the element 65 may be controlled to maintain the element at a temperature below a safe value for the materials used. Reduction of fuel flow during operation allows the torch to to operate with minimal production of NOx. Typically, electrical heating is discontinued after light-off though continued controlled heating may be utilized to provide near instantaneous relight in those situations where aircraft operation, for example, could result in engine flame-out such as by ingestion of water into the engine.

Those skilled in the art will appreciate that many modifications of the preferred embodiment described above can be made without departing from the spirit and scope of the invention.

We claim:

1. A torch assembly for ignition of fuel in admixture with air within a gas combustor, which comprises;

a tubular chamber;

a hot surface igniter contained in the tubular chamber;

means for atomizing fuel into admixture with air;

conduit means for carrying the atomized fuel from the means for atomizing fuel into the tubular chamber;

a partial reaction zone in the tubular chamber;

means for addition of additional air into the partial reaction zone;

electrical means for heating the igniter; and an exit opening out of the chamber for projection of a pilot flame into a combustor.

2. The torch assembly of claim 1 wherein the surface of said igniter comprises an oxidation catalyst.

3. The assembly of claim 2 wherein said catalyst comprises a platinum metal.

4. The assembly of claim 3 wherein said igniter comprises an oxide hardened platinum metal structure.

5. The assembly of claim 1 wherein the means for atomizing comprises an air blast fuel nozzle.

6. The assembly of claim 1 wherein the means for atomizing comprises a pressure atomizer.

7. The assembly of claim 1 wherein said igniter is mounted in the tube.

8. A torch assembly for the ignition of air/fuel mixtures in the walled combustion chamber of a gas turbine, which comprises;

a tube defining a tube lumen, said lumen having a first end and a second end and a first opening into a combustion chamber;

means for atomizing fuel in a mixture with air, mounted in the tube lumen, proximal to the second end;

conduit means for delivery of a liquid fuel to the atomizer;

passage means for carrying air to the atomizer;

catalytic hot surface ignition means for igniting atomized fuel/air mixtures, positioned in the lumen between the atomizer and the first opening;

secondary air addition means positioned to carry secondary air into the tube lumen between the igniter and the first opening.

9. The assembly of claim 8 wherein the means for atomizing fuel comprises a swirler.

10. The assembly of claim 8 wherein the catalytic igniter comprises a platinum metal.

11. The assembly of claim 8 which further comprises means for controlling the temperature of the means for ignition.

* * * * *